United States Patent
Pinschmidt et al.

(10) Patent No.: US 9,945,466 B2
(45) Date of Patent: Apr. 17, 2018

(54) ACTIVE DIFFERENTIAL AND MOTOR VEHICLE

(71) Applicant: AUDI AG, Ingolstadt (DE)

(72) Inventors: Udo Pinschmidt, Gaimersheim (DE); Thomas Schels, Kipfenberg-Schelldorf (DE); Maximilian Wolf, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 97 days.

(21) Appl. No.: 15/100,031

(22) PCT Filed: Nov. 11, 2014

(86) PCT No.: PCT/EP2014/003019
§ 371 (c)(1),
(2) Date: May 27, 2016

(87) PCT Pub. No.: WO2015/078558
PCT Pub. Date: Jun. 4, 2015

(65) Prior Publication Data
US 2017/0002911 A1    Jan. 5, 2017

(30) Foreign Application Priority Data
Nov. 28, 2013  (DE) .................. 10 2013 019 907

(51) Int. Cl.
*B60K 6/365*    (2007.10)
*F16H 48/36*    (2012.01)
*B60K 17/16*    (2006.01)

(52) U.S. Cl.
CPC ............. *F16H 48/36* (2013.01); *B60K 17/16* (2013.01); *F16H 2048/364* (2013.01)

(58) Field of Classification Search
CPC  B60K 6/365; B60K 17/165; B60K 2001/001; B60Y 2300/82
See application file for complete search history.

(56) References Cited

U.S. PATENT DOCUMENTS 9,636,988 B2 * 5/2017 Pinschmidt ............ B60K 6/365
2004/0220011 A1 11/2004 Gumpoltsberger
(Continued)

FOREIGN PATENT DOCUMENTS

CN  101070903  11/2007
DE  102006046419 A1  5/2008
(Continued)

OTHER PUBLICATIONS

International Search Report issued by the European Patent Office in International Application PCT/EP2014/003019.
(Continued)

*Primary Examiner* — Tisha D Lewis
(74) *Attorney, Agent, or Firm* — Henry M. Feiereisen LLC

(57) ABSTRACT

An active differential for the controlled distribution of a drive torque generated by a drive motor to two output shafts includes a planetary gear train configured to couple the two drive shafts to a drive shaft of the drive motor, and a distributor motor including a distributor shaft. The distributor motor produces a torque, with a distribution of a drive torque to the two output shafts being dependent on the torque produced by the distributor motor. The distributor shaft and the planetary gear train are coupled by a coupling device which is configured to separate the distributor shaft from the planetary gear train when an operating parameter of the active differential exceeds a predetermined limit value. The operating parameter can hereby be an output torque difference between torques transmitted from the output shafts to the planetary gear train or a time derivative of the output torque difference.

11 Claims, 1 Drawing Sheet

(56) References Cited

U.S. PATENT DOCUMENTS

| | | |
|---|---|---|
| 2007/0249456 A1 | 10/2007 | Meixner |
| 2008/0064552 A1 | 3/2008 | Tangl |
| 2009/0211824 A1 | 8/2009 | Knoblauch |
| 2010/0240485 A1 | 9/2010 | Strasser |
| 2011/0196556 A1 | 8/2011 | Hennings |
| 2011/0209933 A1 | 9/2011 | Muggeo |
| 2017/0059023 A1* | 3/2017 | Severinsson ............. B60K 6/48 |

FOREIGN PATENT DOCUMENTS

| | | |
|---|---|---|
| DE | 102008061945 A1 | 6/2010 |
| DE | 102009055160 A1 | 6/2011 |
| DE | 102010007640 A1 | 8/2011 |
| EP | 2221207 A1 | 8/2010 |
| WO | WO2010/101506 A1 | 9/2010 |

OTHER PUBLICATIONS

Chinese Search Report dated Nov. 1, 2017 with respect to counterpart Chinese patent application 201480064896.8.
Translation of Chinese Search Report dated Nov. 1, 2017 with respect to counterpart Chinese patent application 201480064896.8.

* cited by examiner

ACTIVE DIFFERENTIAL AND MOTOR VEHICLE

CROSS-REFERENCES TO RELATED APPLICATIONS

This application is the U.S. National Stage of International Application No. PCT/EP2014/003019, filed Nov. 11, 2014, which designated the United States and has been published as International Publication No. WO 2015/0785558 and which claims the priority of German Patent Application, Serial No. 10 2013 019 907.7, filed Nov. 28, 2013, pursuant to 35 U.S.C. 119(a)-(d).

BACKGROUND OF THE INVENTION

The invention relates to an active differential for the controlled distribution of a drive torque generated by a drive motor to two output shafts, including a planetary gear train for coupling the output shafts to a drive shaft of the drive motor and a distributor shaft to a distributor motor, wherein the distribution of drive torque to the output shafts depends on a torque exerted by the distributor motor.

Active differentials are used to distribute drive torques to a plurality of, in particular two, drive shafts. The differential thus allows the two output shafts to have different rotational speeds. When the differential is operated without an additional distributor motor or a complete or partial locking of the differential, the same torques are transmitted to both output shafts. Active intervention in a differential which changes the torque distribution to the output shafts depending on a further introduced torque allows a flexible distribution of torques.

Active differentials are used in particular in motor vehicles for the distribution of the drive torque from a drive motor to the driven wheels of the motor vehicle. In the automotive segment, the use of such an active differential is often referred to as "torque vectoring" or "active yaw". The use of an active differential in the motor vehicle allows in particular an active influencing of the yaw angle of the motor vehicle, since the torques to the individual wheels and thus the forces being transmitted to the respective wheel on the roadway can be separately controlled or adjusted by the active differential.

In particular, when using an active differential in a motor vehicle, it is possible that high loads occur in the differential. Such high loads may occur especially when the rotational speeds of the output shafts are greatly different, or highly different torques work via the output shafts on the differential. It is also possible that, as a result of different response times of different vehicle systems, a large torque is transmitted from a drive motor to the wheels while these wheels are braked. The active differential is also heavily loaded in this case. In view of these high loads, both the service lives of the mechanical elements of the differential and the service times of power electronic components in the active differential can be reduced.

SUMMARY OF THE INVENTION

The invention is thus based on the object of specifying an active differential which makes it possible to reduce the loads of the electrical and mechanical components of the active differential and thus in particular to extend the service life of the components.

The object according to the invention is solved by a differential of the type mentioned at the beginning, wherein the distributor shaft and the planetary gear train are coupled by a separable coupling device, wherein the coupling device is designed to separate the distributor shaft from the planetary gear train when an operating parameter of the differential exceeds a predetermined limit value.

The invention is based on the idea of avoiding damage and high loads of the transmission by which the distributor shaft is separated from the planetary gear train when the operating parameter exceeds certain limit values. The active control of the differential is thus applied and the differential distributes the torque of the drive motor evenly to the output shafts when no additional elements for the complete or partial blocking of the differential are provided. A separation of distributor shaft from the planetary transmission is particularly advantageous since the distributor shaft or the distributor motor is typically operated at high rotational speeds, that is, the planetary gear train or another gear is configured such that the rotational speed of the distributor shaft is higher than the rotational speed difference between the output shafts by a predetermined factor during operation of the active differential. Thus, very high rotational speeds of distributor shaft and thus the distributor motor may thus occur, especially with suddenly occurring large rotational speed differences between the output shafts, which may lead to damage of the distributor motor. This can be avoided by a timely separation of the distributor shaft and thus the distributor motor from the planetary gear train. Also, especially sudden high torque loads to the distributor shaft and thus to the distributor motor can be avoided.

It is hereby possible that the coupling device is configured such that by a mechanical structure of the coupling device alone, the connection between distributor shaft and planetary gear train is separated when the operating parameter is exceeded. For this purpose, known types of clutches are used that connect and/or separate a coupling between two shafts depending on rotational speed or torque. Alternatively or additionally, it is also possible however to determine the operating parameters by sensors, evaluating the currents on the distributor motor or similar and to control the coupling device through a control device that depends on this detected operating parameter.

The operating parameter can be a rotational speed difference between the rotational speeds of the output shafts. The rotational speed of the distributor shaft and thus typically the rotational speed of the distributor motor corresponds to the difference of the rotational speeds between the output shafts scaled with a translation factor. In order to achieve large torque differences between the output shafts through relatively compact distributor motors, the planetary gear train and further gears are typically designed such that the translation factor is relatively large, that is, the distributor shaft has far greater rotational speeds than the difference between the rotational speeds of the output shafts. When the differential is now used, for example, in the motor vehicle and a wheel loses traction, for example, by a lifting the wheel or by a sudden change in friction value, it is thus possible that the rotational speed of this wheel, and thus the output shaft, is greatly increased in the short term as a result of the predetermined torque transmission to the output shafts and in some circumstances by the type of control of the drive motor. In this case, the rotational speed difference between the output shafts and thus the rotational speed of the distributor shaft becomes very large. When a maximum rotational speed of the distributor motor, which for typical electric motors is typically in the range of 10,000 to 15,000 revolutions per minute, is exceeded, damage to the distributor motor may occur after a relatively short time. It is also possible that high currents that must be dissipated are induced in the distributor motor by the great rotational speed. This greatly overloads the power electronics components of the active differential. An intervention by controlling the drive motor and/or the distributor motor can only take place with a relatively large response time since motors have a certain inertia. Therefore, such a control intervention may often not be sufficient to avoid heavy loads of the active differential and a separation of distributor shaft from the planetary gear train by the coupler according to the invention is advantageous.

As mentioned, slow changes in the rotational speed difference can be compensated in many cases by a control of the drive motor or of the distributor motor. Therefore, it is possible that the operating parameter is a time derivative of a rotational speed difference between the rotational speeds of the output shafts. The separation of distributor shaft and planetary gear train by the coupling device according to the invention takes place in this case, when the time derivative of the rotational speed difference exceeds a predetermined limit value. The time derivative of the rotational speed difference can be determined in particular by the rotational speed difference itself or where the rotational speed of the distributor shaft is detected periodically and the periodically detected signal is derived. The time derivative of a periodically detected signal is possible, for example, in which temporally successive measured values are subtracted from each other.

The operating parameter can also be an output torque difference between the torques transmitted from the output shafts to the planetary gear train. When large output torque differences occur, these output torque differences must be applied by the appropriately translated distributor motor. This can lead to a high load of the distributor motor and should therefore be avoided. High output torque differences may occur in a motor vehicle when using the differential, for example, when a high-speed axle based on a frictional value difference is braked by another vehicle system. Also, high output torque differences may arise with highly dynamic rotational speed changes between the wheels of an axle. It is therefore advantageous according to the invention to separate the distributor shaft from the planetary transmission when an output torque difference exceeds a predetermined limit.

Also, further motor vehicle systems are then barely able to compensate output torque differences when they occur suddenly. Therefore, it is also possible that the operating parameter is a time derivative of an output torque difference between the torques transmitted from the output shafts to the planetary gear train. In this case, it is advantageous to detect the output torque difference by a sensor and to derive the sensor signal as described above.

As mentioned above, it is possible that the function of separating the distributor shaft and planetary gear train according to the invention is achieved solely by a mechanical design of the coupling device. Advantageously, however, the differential includes a sensor for detecting the parameter and a control device, wherein the coupling device can be controlled by the control device for the separation and connection of the clutch between the distributor shaft and the planetary gear train depending on the detected parameter. The time curve of the parameter can in particular be considered by the evaluation of the parameter by a control device. Thus, it is possible, as already explained, to compare the derivatives of parameters with a limit value. Alternatively or additionally, it is also particularly easy to monitor a plurality of parameters when controlling the coupling device by the control device. Thus, for example, the rotational speed difference and the output torque difference can be monitored by multiple sensors. This can be done, for example, by a torque sensor and a rotational speed sensor on the distributor shaft. When separate limit values for the rotational speed difference, the time derivative of the rotational speed difference, the output torque difference and/or the time derivative of the output torque difference are now stored in the control device, the clutch between distributor shaft and planetary gear train can be separated when at least one of these limit values is exceeded. A particularly simple consideration of a plurality of operating parameters is thus possible by using a controllable coupling device and the detection of the parameter via one or more sensors.

The coupling device may hereby be a magnetic clutch or include a magnetic clutch, wherein at least one magnet of the magnetic clutch can be controlled by the control device in dependence on the detected parameter. Magnetic clutches can be controlled in which the position of a disk or the arrangement of a magnetic powder or a magnetic fluid is changed by switching a magnet, so that, depending on the switching of the electromagnet, the clutch connects or separates the distributor shaft and the planetary gear train. By using a magnetic clutch, a particularly simply designed electrically controllable coupling device can be formed.

Alternatively, the coupling device may include at least one coupling actuator, which can be controlled by the control device in dependence on the detected parameter and is designed for moving at least one mechanical element of the coupling device by which the distributor shaft and the planetary gear train are coupled. Depending on the specific requirements for the coupling device in the active differential, such a controllable mechanical clutch can be advantageous in the coupling device. In this case, the coupling actuator can especially move the disks of a multiple disk clutch.

As mentioned above, it is advantageously possible that the coupling device itself is mechanically designed such that the distributor shaft is separated from the planetary gear train when an operating parameter of the differential exceeds a predefined limit value, so that a control device is not necessarily needed for the construction of an active differential according to the invention. This can be achieved when the coupling device is a slip clutch or includes a slip clutch. The slip clutch thereby separates the distributor shaft from the planetary gear train upon application of a defined torque. The torque applied to a coupling device that is arranged between distributor shaft and planetary gear train is proportional to the output torque difference. Thus, the use of a slip clutch is particularly advantageous when the operating parameter is the output torque difference.

The slip clutch can be designed in various ways. In particular, the slip clutch can be constructed as a friction clutch. In a friction clutch, the torque transmission is actuated by friction. When a predetermined force is exceeded by the formation of friction clutch, the elements of the friction clutch can rotate relative to each other and the coupling of the elements is canceled. One such friction clutch may be formed, for example, as a radial friction clutch or a cone clutch.

Alternatively it would be possible to design the slip clutch as a hydrodynamic clutch, in which the elements, between which torque is to be transmitted, move in a viscous medium which transmits the torque. In a hydrodynamic clutch, the proportion of the torque which is transmitted depends on the torque applied to the hydrodynamic clutch.

Alternatively, slip clutches may also be achieved by form-fitting transmission of force, wherein the form-fitting engaging parts of the slip clutch are mounted such that the form-fitting clutch is canceled when a predetermined torque is exceeded. Such mountings are possible, for example, in which springs mounted on balls or paddles are used as a form-fitting engaging element.

The coupling device may also be a centrifugal clutch or include a centrifugal clutch. In the active differential according to the invention, the centrifugal clutch can be particularly embodied such that the coupling between distributor shaft and planetary gear train is separated when a rotational speed of the connecting shaft is exceeded. The basic formation of centrifugal clutches is known in the art and will not be explained in more detail here.

The various configurations of the active differential according to the invention can be combined by the skilled person in many ways. Thus, the coupling device may, for example, include a centrifugal clutch and a friction clutch in order to separate the distributor shaft from the planetary gear train both when a predetermined limit value for the rotational speed is exceeded and when a predetermined limit value is exceeded by the torque transmitted from the planetary gear train to the distributor shaft. In particular, when using a control device, a plurality of different operating parameters can be evaluated and the separation of the distributor shaft from the planetary gear train performed depending on these operating parameters.

Furthermore, the invention relates to a motor vehicle that includes a differential according to one of the embodiments described above. As explained above, it is possible in particular when using an active differential in the motor vehicle, that suddenly large rotational speed differences or output torque differences may occur, which may lead to damage of components of the differential. Therefore, it is advantageous to use a differential according to the invention, in which the distributor shaft is separated from the planetary gear train when an operating parameter exceeds a predetermined limit value.

The output shafts may in particular each be coupled to a wheel of the motor vehicle.

BRIEF DESCRIPTION OF THE DRAWING

Further advantages and details of the invention will become apparent from the following embodiments and the accompanying drawings. They show.

DETAILED DESCRIPTION OF PREFERRED EMBODIMENTS

Figure 1:
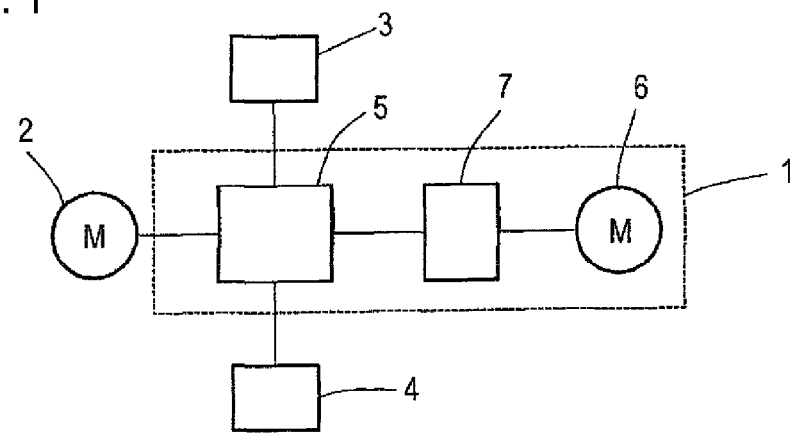
FIG. 1 schematically an embodiment of the active differential according to the invention, FIG. 2 schematically a further embodiment of the active differential according to the invention, and FIG. 3 an embodiment of the motor vehicle according to the invention.

FIG. 1 shows an embodiment of an active differential 1 for the controlled distribution of a drive torque generated by a drive motor 2 to two output shafts 3, 4. The coupling of the drive motor 2 and the output shaft to the output shafts 3, 4 takes place through the planetary gear train 5 of the differential 1. In addition to the planetary gear train 5, the differential 1 includes a distributor motor 6, wherein the distribution of drive torque to the output shafts 3, 4 depends on the torque exerted by the distributor motor 6. The distributor motor 6 is coupled via a distributor shaft to the coupling device 7, which in turn is coupled to the planetary gear train 5. When the coupling device 7 separates the distributor shaft coming from the distributor motor 6 from the planetary gear train 5, the differential 1 the behavior of a non-locked differential, so that the torque generated by the drive motor 2 is equally distributed to the output shafts 3 and 4. When the distributor shaft coming from the distributor motor 6 is connected to the planetary gear train 5 by the coupling device 7, the torque of the distributor motor 6 thus controls the distribution of the drive torque to the output shafts 3 and 4.

Typically, a controlled operation of the differential 1 is desired, so that the coupling device 7 in the normal operating state of the differential 1 connects the distributor shaft coming from distributor motor 6 to the planetary gear train 5. However, the coupling device 7 is designed such that the distributor shaft is separated from the planetary gear train when an operating parameter of the differential distributor shaft 1 exceeds a predetermined limiting value. Therefore, no separate control device should be provided for the coupling device in the embodiment, but the coupling device should be constructed purely mechanically such that a separation of the distributor shaft from the planetary gear train 5 occurs both with the exceeding of a rotational speed difference between the rotational speeds of the output shafts 3, 4 as well as with the exceeding of a predetermined output torque difference between the momentums transmitted from the output shafts 3, 4 to the planetary gear train 5. To do this, the coupling device 7 includes a friction clutch and a centrifugal clutch. It is thereby particularly possible that the centrifugal clutch is designed so that the power transmission takes place by friction with connected centrifugal clutch and the centrifugal clutch thus serves as a slip clutch, which decouples the distributor shaft from the planetary gear train when a predetermined torque is exceeded.

Figure 2:
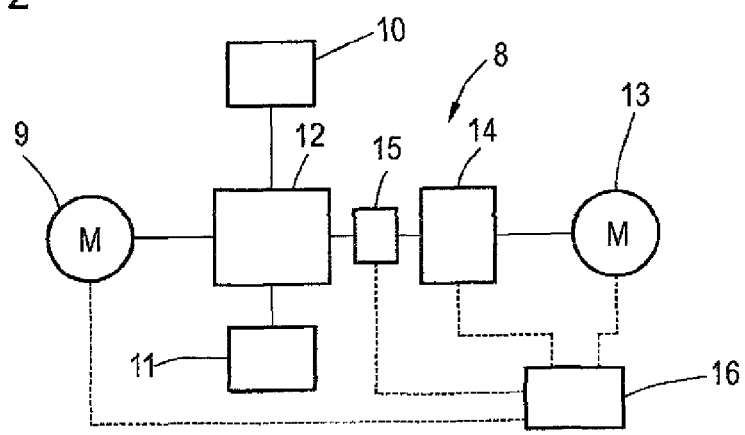

FIG. 2 shows a further embodiment of the active differential. The active differential 8 is substantially designed as the differential 1 shown in FIG. 1, wherein it differs from the differential 1 shown in FIG. 1 by the design of the coupling device 14 and by the use of an additional sensor 15 and the control device 16. Like in the differential 1 shown in FIG. 1, a drive torque of the drive motor 9 is distributed to the output shafts 10 and 11 by the planetary gear train 12 of the differential 1. The distributor motor 13 is thereby coupled via the distributor shaft and the coupling device 14 to the planetary gear train 12. In addition, a sensor 15 is arranged between planetary gear train 12 and coupling device 14, which detects both the rotational speed of the shaft between planetary gear train 12 and coupling device 14 and the torque transmitted by the shaft. The data detected by the sensor 15 are made available to the control device 16. The control device 16 thereby controls the drive motor 9, the distributor motor 13 and the coupling device 14 depending on the data detected by sensor 15 and in addition data present in the motor vehicle.

The coupling device 14 is thereby designed as a magnetic clutch which connects or does not connect the distributor shaft to the planetary gear train 12 depending on a control signal of the control device 16. For controlling the coupling device, the control device 16 detects both the torque detected by the sensor 15 and the rotational speed detected by the sensor 15. In addition, the time derivatives of these quantities are calculated in the control device 16. Limit values are stored in the control device 16 for each of these values, thus the torque, the time derivative of the torque, the rotational speed and the time derivative of the rotational speed. When one of these values exceeds the associated limit value, the coupling between the distributor shaft and the planetary gear train 12 is separated by the emission of a control signal to the coupling device 14.

Figure 3:
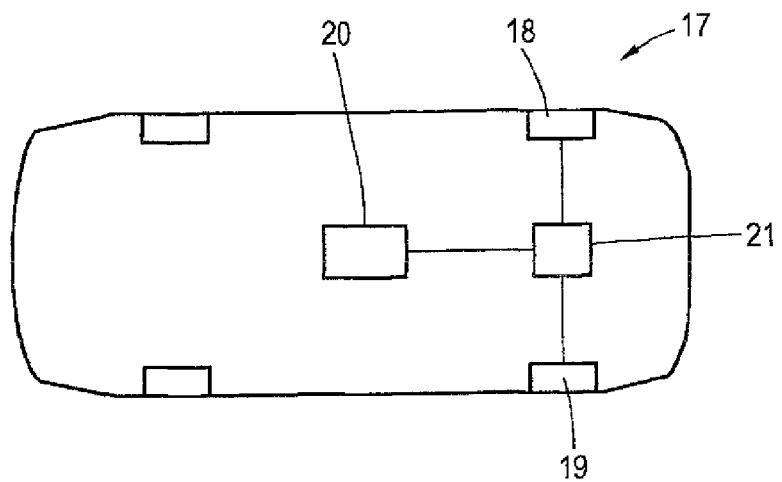

FIG. 3 shows an embodiment of a motor vehicle which includes an active differential. The motor vehicle 17 has a rear wheel drive, wherein the rear wheels 18, 19 are operated by the drive motor 20. The distribution of the drive torque provided by the drive motor 20 to the wheels 18, 19 is performed by the active differential 21. The active differential 21 is constructed corresponding to the differential 1 shown in FIG. 1. Alternatively, a construction of the differential 21 corresponding to the differential 8 shown in FIG. 2 would also be possible of course.

What is claimed is:

1. An active differential for the controlled distribution of a drive torque generated by a drive motor to two output shafts, comprising:
 a planetary gear train configured to couple the two output shafts to a drive shaft of the drive motor;
 a distributor motor including a distributor shaft, said distributor motor producing a torque, with a distribution of a drive torque to the two output shafts being dependent on the torque produced by the distributor motor; and
 a separable coupling device coupling the distributor shaft and the planetary gear train and configured to separate the distributor shaft from the planetary gear train when an operating parameter of the active differential exceeds a predetermined limit value, with the operating parameter being an output torque difference between torques transmitted from the output shafts to the planetary gear train or a time derivative of the output torque difference.

2. The active differential of claim 1, further comprising a sensor configured to detect the operating parameter, and a control device configured to control the coupling device in dependence on the operating parameter, detected by the sensor, for separating and connecting the coupling between the distributor shaft and the planetary gear train.

3. The active differential of claim 2, wherein the coupling device is a magnetic clutch or includes a magnetic clutch, said magnetic clutch including at least one magnet controlled by the control device in dependence on the operating parameter, detected by the sensor.

4. The active differential of claim 2, wherein the coupling device includes at least one mechanical element, which is configured to couple the distributor shaft and the planetary gear train, and at least one coupling actuator, which is controlled by the control device in dependence on the operating parameter, detected by the sensor, said at least one coupling actuator being operably connected to the at least one mechanical element for movement of the at least one mechanical element.

5. The active differential of claim 1, wherein the coupling device is a slip clutch or includes a slip clutch.

6. A motor vehicle, comprising:
 two output shafts;
 a drive motor generating a drive torque; and
 an active differential for distributing the drive torque to the two output shafts, said active differential comprising a planetary gear train configured to couple the two output shafts to a drive shaft of the drive motor, a distributor motor including a distributor shaft, said distributor motor producing a torque, with a distribution of a drive torque to the two output shafts being dependent on the torque produced by the distributor motor, and a separable coupling device coupling the distributor shaft and the planetary gear train and configured to separate the distributor shaft from the planetary gear train when an operating parameter of the active differential exceeds a predetermined limit value, with the operating parameter being an output torque difference between torques transmitted from the output shafts to the planetary gear train or a time derivative of the output torque difference.

7. The motor vehicle of claim 6, wherein the active differential includes a sensor configured to detect the operating parameter, and a control device configured to control the coupling device in dependence on the operating parameter, detected by the sensor, for separating and connecting the coupling between the distributor shaft and the planetary gear train.

8. The motor vehicle of claim 7, wherein the coupling device is a magnetic clutch or includes a magnetic clutch, said magnetic clutch including at least one magnet controlled by the control device in dependence on the operating parameter, detected by the sensor.

9. The motor vehicle of claim 7, wherein the coupling device includes at least one mechanical element, which is configured to couple the distributor shaft and the planetary gear train, and at least one coupling actuator, which is controlled by the control device in dependence on the operating parameter, detected by the sensor, said at least one coupling actuator being operably connected to the at least one mechanical element for movement of the at least one mechanical element.

10. The motor vehicle of claim 6, wherein the coupling device is a slip clutch or includes a slip clutch.

11. The motor vehicle of claim 6, further comprising wheels, said output shafts being coupled with the wheels in one-to-one correspondence.

* * * * *